United States Patent [19]

Carignani et al.

[11] 3,851,827
[45] Dec. 3, 1974

[54] METHOD AND DEVICE FOR TRANSFORMING SLURRIES COMING FROM WET PURIFICATION PLANTS FOR FUMES FROM BLAST FURNACES AND BASIC OXYGEN FURNACES INTO A CONTROLLED SIZE GRANULAR SOLID MATERIAL

[75] Inventors: Milvio Carignani, Tarranto; Michele Conti, Genoa-Quarto; Casimiro Dufour-Berte; Geremia Rossi, both of Genoa; Edoardo Pasero, Rome; Hermann Zmolnig, Genoa, all of Italy

[73] Assignee: Italsider S.p.A., Genova, Italy

[22] Filed: July 19, 1973

[21] Appl. No.: 380,931

Related U.S. Application Data

[62] Division of Ser. No. 69,054, Sept. 2, 1970, Pat. No. 3,770,415.

[30] Foreign Application Priority Data
Sept. 10, 1969 Italy .................................. 7304/69

[52] U.S. Cl. ............................................... 241/65
[51] Int. Cl. ........................................... B02c 21/00
[58] Field of Search .................... 241/54, 65, 78–80; 75/1, 3, 30

[56] References Cited

UNITED STATES PATENTS

| 2,695,221 | 11/1954 | Hugh et al. .................... 241/54 X |
| 2,810,633 | 10/1957 | Cooper ................................. 75/3 |
| 2,990,267 | 6/1961 | Grebe et al. .................... 75/30 X |
| 3,165,268 | 1/1965 | Haussig ........................ 241/78 X |
| 3,314,783 | 4/1967 | Zimmerley et al. ............ 75/30 X |

Primary Examiner—Roy Lake
Assistant Examiner—E. F. Desmond
Attorney, Agent, or Firm—Nolte & Nolte

[57] ABSTRACT

A method and device for transforming slurries coming from wet purification plants for fumes from blast furnaces and basic oxygen furnaces into a controlled size granular solid material.

Object of the method concerned is to recover the steel mill and basic oxygen furnace slurries and slimes and to transform same into a solid material which may be easily carried by the usual carrying means used in steel mills, and has a controlled granulometric distribution. Such a material further may be sent together with the other iron ores to the installations for preparing the steel mill burden (homogeneizing, sintering and the like), or it may be treated by particular devices which render it immediately usable in steel mills.

11 Claims, 5 Drawing Figures

METHOD AND DEVICE FOR TRANSFORMING SLURRIES COMING FROM WET PURIFICATION PLANTS FOR FUMES FROM BLAST FURNACES AND BASIC OXYGEN FURNACES INTO A CONTROLLED SIZE GRANULAR SOLID MATERIAL

This is a division, of application Ser. No. 69,054 filed Sept. 2, 1970, now U.S. Pat. No. 3,770,415, issued Jan. 11, 1974.

BACKGROUND OF INVENTION

The object of the present invention is a method and device for transforming slurries coming from wet purification plants for fumes from steel mills and basic oxygen furnaces into a controlled size granular solid material.

However, in its broader purpose, the present invention may be used for treating generally slimes coming from industrial metal operations, particularly steel operations, comprising very thin particles, in order to use same again in form of granular agglomerates. The possibilities of use for the granular materials obtained by the invention are the following three, considering only the main ones:

feeding to the homogeneizing plants of the steel mill burdens;

direct feeding to steel mills after baking;

direct addition to converter after possible baking.

Object of the method concerned is to recover the steel mill and basic oxygen furnace slurries and slimes and to transform same into a solid material which may be easily carried by the usual carrying means used in steel mills, and has a controlled granulometric distribution. Such a material further may be sent together with the other iron ores to the installations for preparing the steel mill burden (homogeneizing, sintering and the like), or it may be treated by particular devices which render it immediately usable in steel mills.

As it is known, at present the problem of recovering the above mentioned slurries and slimes is solved in different ways which mostly depend on the local conditions (place of the mill, availability of space and so on). The utilization of such materials, which become available downstream of the wet removing plants in form of dilutes slurries, faces a series of technological problems depending on their dehumidification (being materials with very fine granulometry, in the range of one micron, particularly from slimes from B. C. F. red fumes) and the transport of slimes within the mill (the continuous transport by means of belt conveyors being often prevented by the high content of humidity residual after thickening and filtering).

Owing to the above difficulties in some mills the above materials are not recovered and the slurries are discharged direct into sewers; other plants are used to recover partially only the steel mill slimes or only the basic oxygen furnaces slimes, said recover being obtained by slurry thickening and filtering methods, followed by storing same for long periods of time in order to have them dried in a natural way. For B.O.F. slimes only, some plants use a method (Baumco method) consisting of mixing the filtered slimes to a suitable amount of powdered lime in order to set the whole, or part of, the free humidity contained in said slimes.

Generally, it may be said that the problem of recovering and using said by-products of the steel industry has not yet been definitely solved. The methods used by the various plants are not always satisfying and some of them causes inconveniences as the pollution in discharge places, or charges often much too heavy like the need of needing large spaces for storing said materials. It is further to be noted that the problem involves considerable charges, as said materials represent about 1–2 percent of the whole ferrous burden and have a high aggregate content of iron (an average 65 percent on dry in the steel mill slimes and 50 percent on blast furnace slimes).

SUMMARY OF INVENTION

The object of the present invention is a method and device for transforming slurries coming from wet purification plants for fumes from steel mills and basic oxygen furnaces into a controlled size granular solid material.

The claimed method is intended for solving the whole problem of recovering the blast furnace and steel mill slimes by means of a series of successive treatments which allow to obtain, starting from the washing waters for the wet purification plants, a solid granular product easy to be handled and carried and suitable to be utilized like any iron ore in preparing the blast furnace burden.

The method for transforming the slurry coming from the wet purification plants for the blast furnace and basic oxygen furnaces fumes into a granular solid material of controlled size is characterized in comprising the following steps: in a first step the slurry coming from the basic oxygen furnace and/or the blast furnace wet purification devices are decanted in one or more passages, the two slurries being mixed before or after any mentioned decantation passages; in a second step the thickened and mixed slurry coming from the decantation step, after a possible addition of small amonts of flocculant materials, is subject to centrifugation or filtration; in a third step the thickened slurry, after possible addition of small amounts of a binder like lime, bentonite or the like, is subject to drying and granulation; in a fourth step the granular material is subject to sieving.

The claimed method is also characterized in that in said first step, separately, the two slurries coming from the wet purification devices of the basic oxygen furnace and the blast furnace respectively, are conveyed to corresponding tanks of continuous sedimentation from the bottom of which is removed a slurry which undewents a first thickening and whose solid content is in the range of about 200–600 grams/liter; then the slurries so thickened are mixed and subjected to a further passage of continuous sedimentation from which a thickened slurry is removed with a solid content of about 400–1,000 grams/liter.

The claimed method is still characterized in that in said first step the slurries coming from the wet purification devices of the basic oxygen furnace and the blast furnace respectively are mixed at once to each other in a common decantation tank from which a thickened slurry whose solid content is in the range of about 250–700 grams/liter is continuously removed.

The above method is then characterized in that said flocculant materials, in amounts between 0.1 and 0.3 grams for each liter of slurry, consists of organic flocculants of conventional kind, as for instance those products known by the name PRAESTOL.

Said method is also characterized in that said second step is embodied through centrifugation in a screw feeder centrifugal separator, the humidity present in the slurry coming from said centrifugal separation being between 20 and 30 percent and preferably between 23 and 28 percent.

The above method is still characterized in that said second step is embodied through filtering, preferably by means of a rotating filter, the humidity present in the filtered slurry being between 25 and 40 percent and preferably between 30 and 35 percent.

The above method is also characterized in that in said third step the amount of binder used, like lime, bentonite and the like, is between 3 and 8 percent and preferably 5 percent.

The method is further characterized in that in said third step the thickened slurry is fed inside a drying-granulating rotating drum, preferably in co-current with a flow of hot gases at the temperature of 700°–1,000°C, the thermal units given the material under drying being such to keep the temperature not above 50°–90°C, the period of time during which the thickened slurry remains in said drying-granulating device being between 15 and 60 minutes and preferably 30 minutes, such a time being selected according to the percent of humidity of the slime entering said drum, so that the humidity of the granular materials coming out of said drying-granulating device may be between 5 and 13 percent.

Said method is then characterized in that in said fourth step is selected a fraction of granules whose diameter is anyhow between 0.1 and 20 mm., the granules coming from sieving being recycled to the drying-granulating device, and the granules larger than the upper level each time chosen are subject to grinding and to further sieving.

Said method is still characterized in that the granular material coming from said fourth step is conveyed to a device for preparing and homogenizing the blast furnace burdens.

The above method is further characterized in that the granular material coming from said fourth step is conveyed to a baking device, preferably a rotating furnace provided with a pre-heating grate, the temperature of said baking being between 1000° and 1200°C.

The method is finally characterized in that the granular material coming from said fourth step, after said baking at a temperature between 1000° and 1200°C, is conveyed directly to the basic oxygen furnace.

The device suitable to embody the above method is comprising: one or more decantation tanks for receiving the slimes coming from the wet purification devices of the basic oxygen furnace and the blast furnace; at least a dehydrating device consisting of a centrifugal separator, preferably of the screw feeder type, and/or of a filter; a drying-granulating device passed through preferably in co-current by the product to be dried and granulated and by the drying hot fumes; at least a sieve for separating the granular material with the desired size, as well as means for recycling the granules passed through the sieve to the inlet of the drying-granulating device, and means for grinding the granular material with eccessive size coming from said drying-granulating device.

The above device is further characterized in that said drying-granulating device consists of a rotating drum, with its axis inclined towards the outlet, provided at the top with a feeding port for the slime to be dried as well as with a burner arranged at the same end. The inner surface of said drum being provided along a first section with at least a stationary scraper or a blanding integral with said drum and along a second central section with a set of longitudinal bars or ribs projecting from said inner surface, and finally along the final section with means suitable to slow down the outflow of the material from inside said drum. Spraying means for controlling the humidity of the material under drying being further provided.

Said device is still characterized in that said means for slowing down the outflow of the material consist of one or more helical ribs which are continuous or interrupted and suitably inclined.

The above device is finally characterized in that said burner produces combustion fumes at a temperature of 700°–1,000°C, the hour delivery of said gases being defined according to the delivery of slime to be dried, so that during the passing through of the furnace the temperature of the material under drying may not exceed 50°–90°C; the length and rotation speed of said drum being selected in such a way that the period of time for the passing through of the drum by the material to be dried is between 15 minutes and 1 hour and preferably of 30 minutes.

DESCRIPTION OF THE PREFERRED EMBODIMENTS

Figure 1:
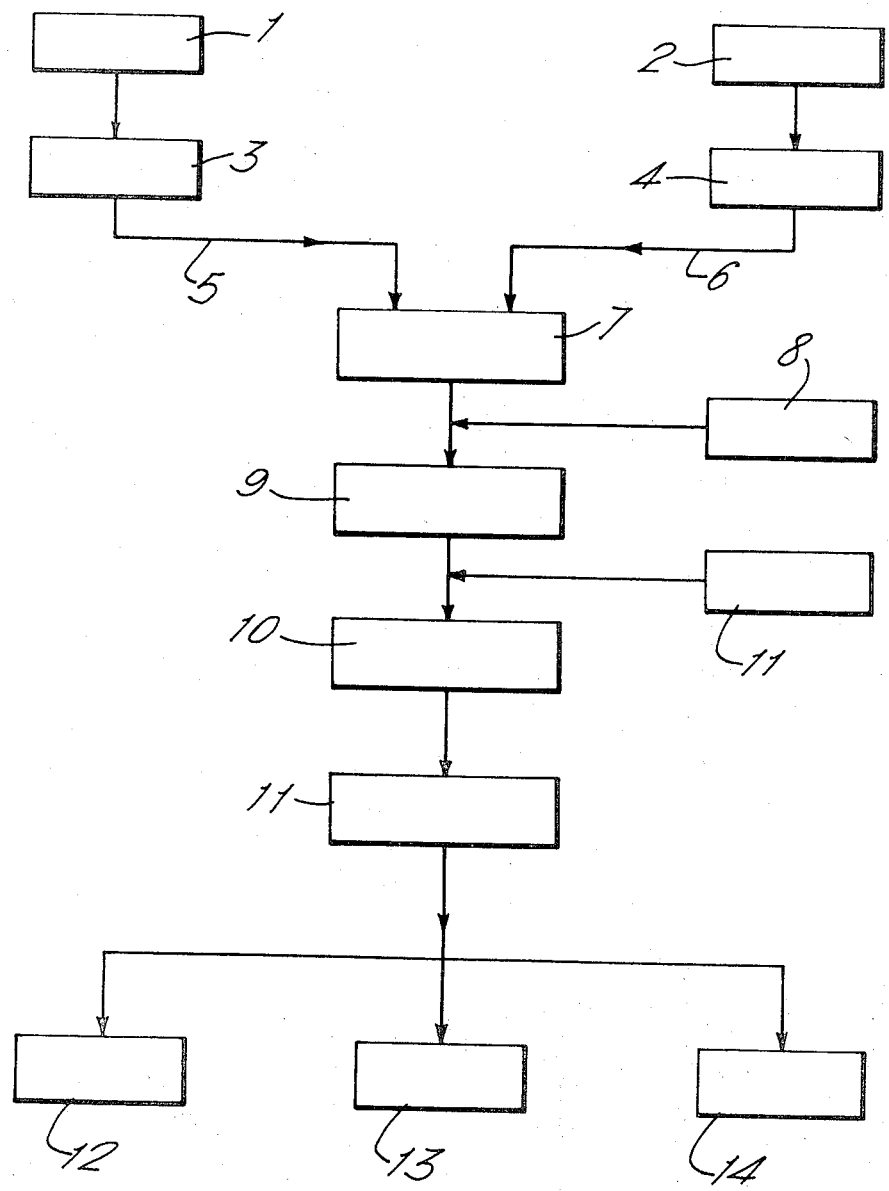
FIG. 1 shows a diagram of the claimed method.

With reference to the diagram shown in FIG. 1: the washing waters coming from the wet purificator devices for the fumes of blast furnace 1 and those coming from the similar wet purification devices for the fumes of basic oxygen furnace 2 are conveyed to suitable decantation tanks 3,4 from the bottom of which are removed continuously thickened slurries 5,6 having a solid content between 250 and 500 grams/liter; said slurries are conveyed to a single mixing tank 7 with the double function of mixing the two materials and causing a further thickening of the resulting slurry. Said slurry is removed from the bottom of said tanks with a solid content of about 400–1000 grams/liter. Said slurry, possibly added with a small amount of flocculant products 8 is fed continuously to a screw feeder drum centrifuge 9 which discharges a slime with an average degree of humidity preferably between 20 and 30 percent.

The centrifuged slime is conveyed to the drying-granulating device 10, and before that it may be possibly added with a small quantity of lime 11 (about 5 percent of the slime weight), through a suitable mixer, said lime acting as a binder in the subsequent granulation treatment. The operations of drying and granulating are performed in a rotating drier (see FIG. 3) wherein the material to be treated moves in co-current with the combustion products; the first section of said drier starting from the feed side of the material is provided with stationary scrapers 31 suitable to avoid any formation of slime seals adhering to the drum wall, suitable shaped ribs or blades fixed to the inner wall of said first section of the drum may be advantageously used instead of said stationary scrapers. In its central section the inner surface of the rotating drum bears abutments 32 shaped in such a way as to cause drawing of the blocks of material under drying and their fall on the drum bottom with consequent breaking of said blocks and formation of granular material. In the last section of the drum, having an inner smooth surface, such a granular material takes up the final shape (mainly granules of rounded shape) and undergoes a further drying to the herebelow mentioned desired final values, taking up the characteristics of compactness and strength necessary for the subsequent treatments. In order to increase the filling degree of said drum, said final section is provided with helical ribs or equivalent means suitable to slow down the outgoing of the material.

The average working condition of the rotating drier and the characteristics of the material treated thereby are:

slime humidity at the inlet: 20-45 percent;

granular material humidity at the outlet: 6-11 percent also in relation to the granulometric distribution;

average time of staying inside the drum: about 20-30 minutes;

temperature of the material during the treatment: 50°-90°C (without remarkable changes along along the axis;

temperature of the combustion products at the inlet: 700°-1000°C;

characteristics of the produced granular materials: granulometric interval mostly comprised between 1 and 20 mm.;

crush strength about 3 kgms. (defined on small balls with an average diameter of 16 mm.).

The low temperature of the material during the entire treatment allows to operate with a not-coated rotating drum.

The produced granular material is sieved in 11 at the drum outlet; the possible fraction thereof having a higher granulometry than the maximum required, with respect to the subsequent particular use, may be grinded to the required degree in a mill fed with the sieve discharge.

The final product so obtained is conveyed together with the other ores to the devices 12 for preparing the blast furnace burden, or in a particular embodiment it may be fed to a high temperature rotating furnace 13, so as to be subject to a sinterization process making it suitable to a possible direct charging into a blast furnace; according to a third solution the final product, after possible further treatments, may be conveyed directly to a converter 14.

Figure 2:
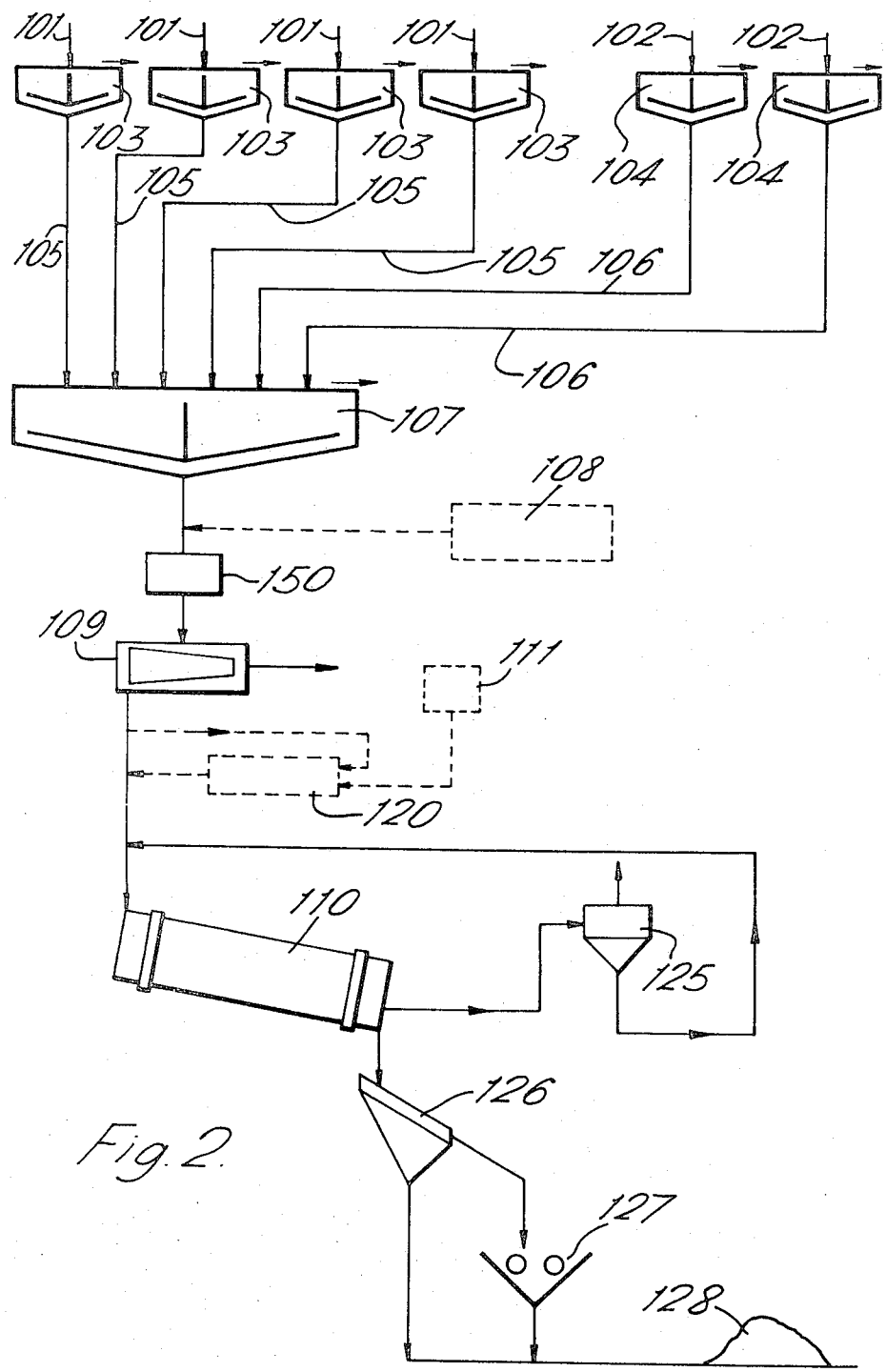
FIG. 2 shows a diagram of a device suitable to embody the invention according to a first example of embodiment described hereafter.

EXAMPLE 1:

Such an example is diagrammatically shown in FIG. 2 showing the diagram of the operation cycle. The washing waters 101 coming from the wet purification devices for the blast furnace fumes, in a quantity of 1500-2000 m³/h, and those 102 coming from the similar devices for the basic oxygen furnace fumes, in a quantity of 1000-1500 m³/h, are conveyed to suitablde decantation tanks 103,104, from the bottom of which are removed continuously thickened slurries 105,106 having a solid content between 250 and 400 grams/-liter; said slurries, in a quantity of about 20 m³/h from the blast furnace decanter devices and 40 m³/h from the steel mill ones, are sent to a single mixing tank 107 having the double function of mixing said two materials and causing a further thickening of the resulting slurry; the latter, in a quantity of 35-40 m³/h is removed from the bottom of said tank with a solid content between 400 and 700 grams/liter; such a thickening is obtained with 5-10 hours of staying times.

Figure 4:
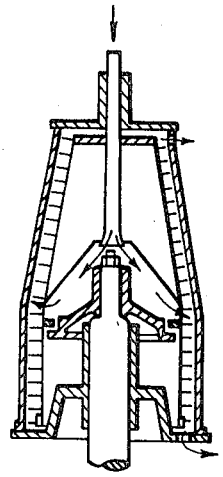
FIG. 4 shows diagrammatically a vertical longitudinal section of a screw feeder drum centrifugal device of the type used in the plant shown in FIG. 2.

Said slurry, possibly added with a small amount of flocculant materials coming from 108, is fed continuously to a drum centrifugal device 109, of the screw feeder type, a diagram of which is shown in FIG. 4; with particular reference to said FIG. 4, it shows a kind of drum centrifugal separator, of the screw feeder type, used in the embodiment of the claimed device, as shown in Example 1.

Such a centrifugal separator is known per se and comprises a rotating drum inside of which rotates a screw feeder with a number of turns slightly higher than the one of the drum. In such a way said screw feeder rotates very slowly with respect to said drum and removes from same the centrifuged material.

The liquid is obviously removed in a conventional way as in the usual centrifugal devices.

Said centrifugal device discharges a slime having an average humidity content from 23 to 28 percent.

As a good operation of the centrifugal device requires a feed at constant density, a device 150 for automatically checking and adjusting the density of the incoming slurry is arranged upstream of the centrifugal device.

The flocculant materials added to the slurry to be centrifuged are conventional flocculant materials, as for instance, the various types of PRAESTOL; the amount added being around 0.1 - 0.15 grams for each liter of slurry treated.

The centrifuged slime is conveyed to the granulating and drying device 110, before being introduced into said device said slime may be possibly added with, through a suitable mixer 120, a small amount of lime (about 5 percent of the slime weight) coming from 111, which acts as a plasticizer and binder in the subsequent granulation treatment; bentonite or ferrous sulphate could be for instance added instead of lime.

As the slime fed to drier 110 is a material difficult to be carried, the feeding to drum 110 is performed through suitable devices as vibrating hoppers, screw feeders, chain conveyors and the like.

Figure 3:
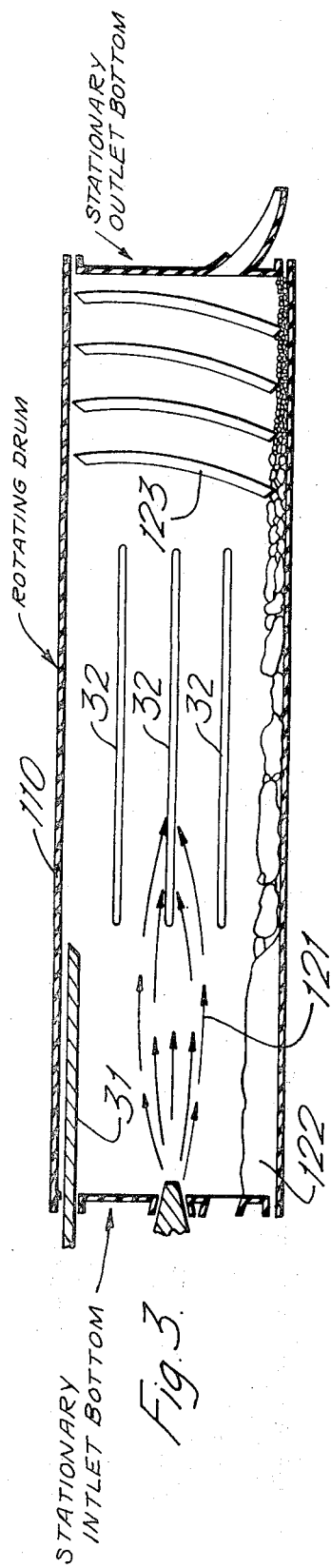
FIG. 3 shows diagrammatically a vertical longitudinal section of a drying-granulating device according to the invention of the type generally shown in FIGS. 1 and 2.

The drying and granulating operations are performed in the rotating drum 110 (a diagram of which is shown in FIG. 3), where the material to be treated 122 moves in co-current with the combustion products 121. The first section of such a drum starting from the material feeding side is provided with stationary scrapers 31 suitable to avoid the formation of slime seals adhering to the cylinder wall; in the central section the inner surface of the rotating cylinder comprises shaped abutments 32 so as to cause the drawing of the material blocks under drying and their fall onto the cylinder bottom, with consequent breaking of said block and formation of the granular material; in the last section of said cylinder, the granular material takes up its final shape (mainly as granules of rounded shape) and is subject to a further drying up to the required degree, herebelow mentioned, assuming the characteristics of compactness and strength necessary for the subsequent treatments.

The final section of the drying-granulating device is preferably provided with ribs, e.g. helical ribs 123, suitable to slow down the outgoing of the material by increasing the filling degree in said end portion of the drum.

In order to confer the system a higher elasticity and to be in position to act at once for short periods of time to amend possible changes in the movement of the drier, inside same is provided possibly in a removable way, a humidifier bringing the amount of water necessary to obtain again the necessary humidity for a correct granulation of the product.

From the point of view of the material contained in drum 110, said material in the first section of said drum is still in form of a pasty slime; in the second section it is in from of blocks in decreasing size under granulation; in the third section it is an actual granular material which is setting if, through one of the above mentioned means, is kept for a sufficient period of time in such a section.

The average operating condition of said device and the characteristics of the material treated thereby are:

slime humidity at the inlet: 23–28 percent;
granular material at the outlet: 6–11 percent;
average time of staying inside the drum: 20–45 minutes;
peripheral speed of the drum inner surface: 20–60 m/1'; :
temperature of the material during treatment: 50–90°C (without remarkable changes along the axis);

temperature of the combustion products at the inlet: 700°–900°C;
characteristics of the granular material produced: granulometric interval between mostly 1 and 20 mm.; crush strength about 3 kgs (defined on small balls having an average diameter of 16 mm.).

The possible powders carried by the fumes going out of the drum are collected in a cyclone 125 (see FIG. 2) and put again into cycle with the centrifuged slimes.

The produced granular material is sieved in 126 at the drum outlet; the possible fraction having a granulometry higher than the maximum required in relation to the particular subsequent treatment, may be grinded in 127 up to the required limit in a mill fed by the sieve discharge. The final product so obtained is conveyed to the homogeneization piles 128 of the ferrous burden for the blast furnace feeding.

Figure 5:
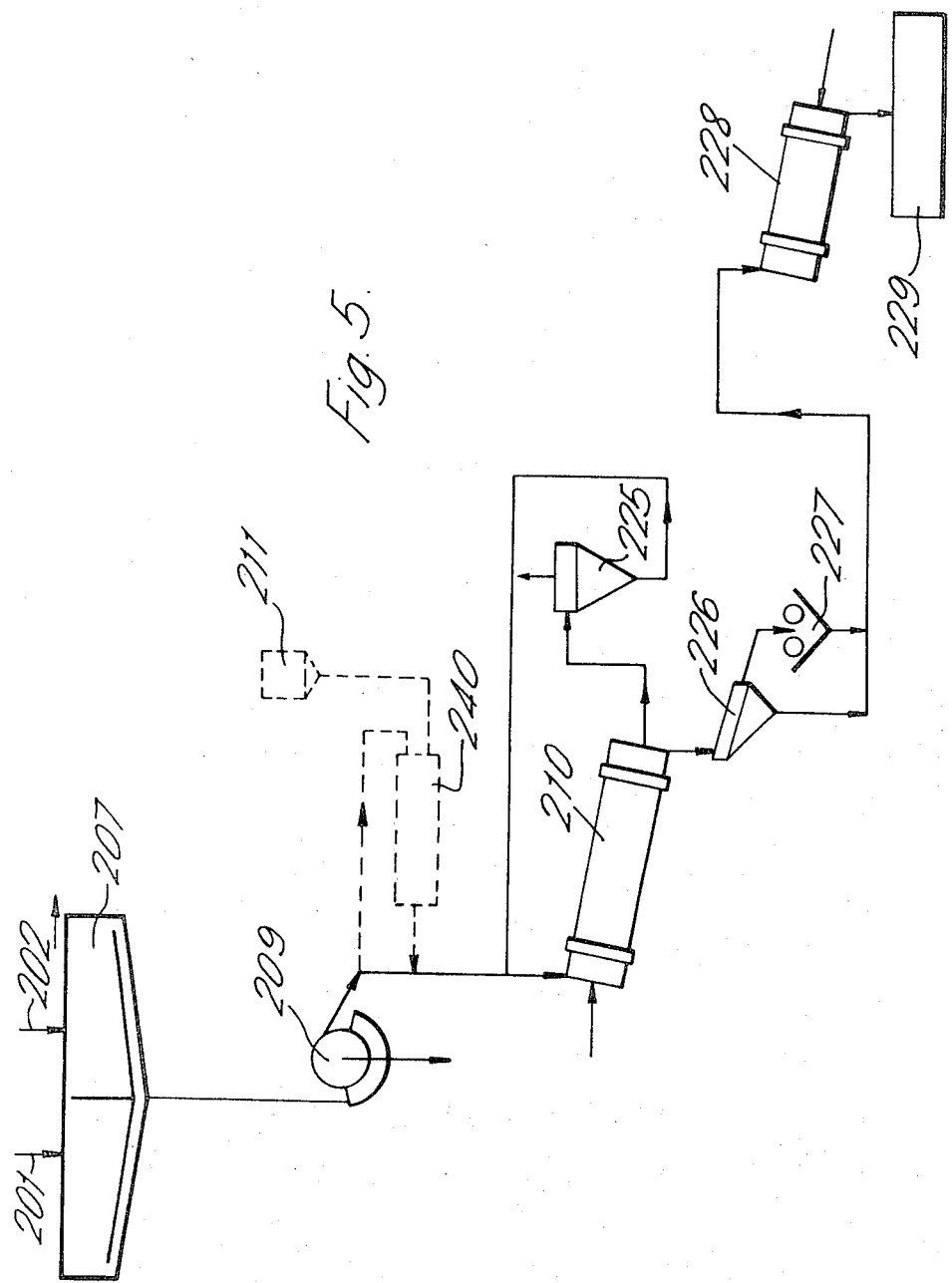
FIG. 5 shows the diagram of a device suitable to embody the present invention according to another embodiment described hereafter.

EXAMPLE 2:

The cycle diagram is shown in FIG. 5. The washing waters 201,202 coming from the wet purification devices for the blast furnace fumes and those for the basic oxygen furnace fumes are all conveyed to a single decantation and mixing tank 207, from the bottom of which a slurry having a solid content between 250 and 600 grams/liter is continuously removed; such a slurry is fed to a rotating vacuum filter 209 (Oliver filter) which discharges a slime filtered with an average content of humidity of 25–40 percent.

Such a filtered slime, possibly added with a quantity of lime, coming from 210, between 5 and 10 percent is fed to the drying and granulating device 210 as in Example 1, after possible mixing in 240.

The granular product coming from 210, after sieving in 226 and possible grinding when required in 227, is conveyed to a rotating baking furnace 228 at high speed (1000°–1200°C) provided with a pre-heating grate, so as to be subjected to a sintering process making it suitable to the possible direct charging into a blast furnace 229.

The fumes coming out of drum 210 are purified in cyclon 225, and the fumes so collected are recycled to drum 210.

Although for describing reasons the present invention has been based on what above described and shown by way of example only in the accompanying drawings, many variations and changes may be made in embodying the invention, all of them however having to be considered as based on the following claims.

What is claimed is:

1. Apparatus for obtaining from a first slurry coming from a wet purification plant of a blast furnace and a second slurry coming from a wet purification plant of a basic oxygen furnace, a granular solid material of controlled size which is reusable in a blast furnace, said apparatus comprising: at least one decantation tank for receiving slurries coming from the wet purification devices of the basic oxygen furnace and the blast furnace; a dehydrating device; a drying-granulating device means for passing hot fumes through said drying-granulating device; a sieve for separating the granular material of the desired size, and means for recycling the granules passed through the sieve to an inlet of the drying-granulating device, and means for grinding the granular material of excessive size coming from said drying-granulating device.

2. Apparatus as claimed in claim 1 wherein said drying-granulating device consists of a rotatable drum, means for rotating said drum, the drum being disposed with its axis inclined towards an outlet therefrom and provided at its top with a feeding port for the material to be dried and a burner arranged at the same end; the inner surface of said drum being provided with, along the first section at least a stationary scraper and along a second central section with a set of longitudinal bars integral with said drum and projecting from the inner surface thereof and finally along a final section with means for slowing down the outflow of the material from inside said drum; and spraying means for controlling the humidity of the material in said drying-granulating device.

3. Apparatus as claimed in claim 2 wherein said means for slowing down the outflow of the material consists of at least one helical rib.

4. Apparatus as claimed in claim 2 wherein said burner produces combustion fumes at a temperature of 700° to 1,000°C, and means are provided for controlling the rate of delivery of said gases in accordance with the rate of delivery of material to be dried whereby during the passage of the material to be dried through said drying-granulating device the temperature of the material does not exceed 50° to 90°C; said means for rotating the drum being controllable whereby the passage of material to be dried through said drying-granulating device occurs over a period of between 15 and 60 minutes.

5. Apparatus as claimed in claim 1 wherein said dehydrating device comprises a centrifugal separator.

6. Apparatus as claimed in claim 5 wherein said centrifugal separator is of the screw-feeder type.

7. Apparatus as claimed in claim 1 wherein said dehydrating device comprises of a filter.

8. Apparatus as claimed in claim 5 wherein said dehydrating device also comprises a feeder.

9. Apparatus as claimed in claim 1 wherein said means for passing hot fumes through said drying-granulating device is arranged to pass those fumes in co-current with the product to be dried and granulated.

10. Apparatus as claimed in claim 3 wherein said helical rib is continuous.

11. Apparatus as claimed in claim 3 wherein said helical rib is discontinuous.

* * * * *